Jan. 9, 1940.  G. T. PFLEGER  2,186,494
SUBMERSIBLE ELECTRIC MOTOR
Filed Dec. 6, 1937  2 Sheets-Sheet 1
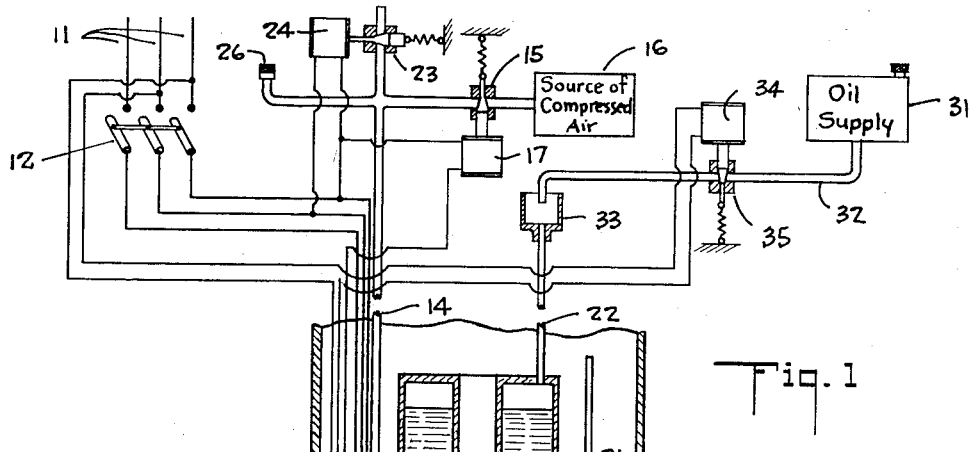
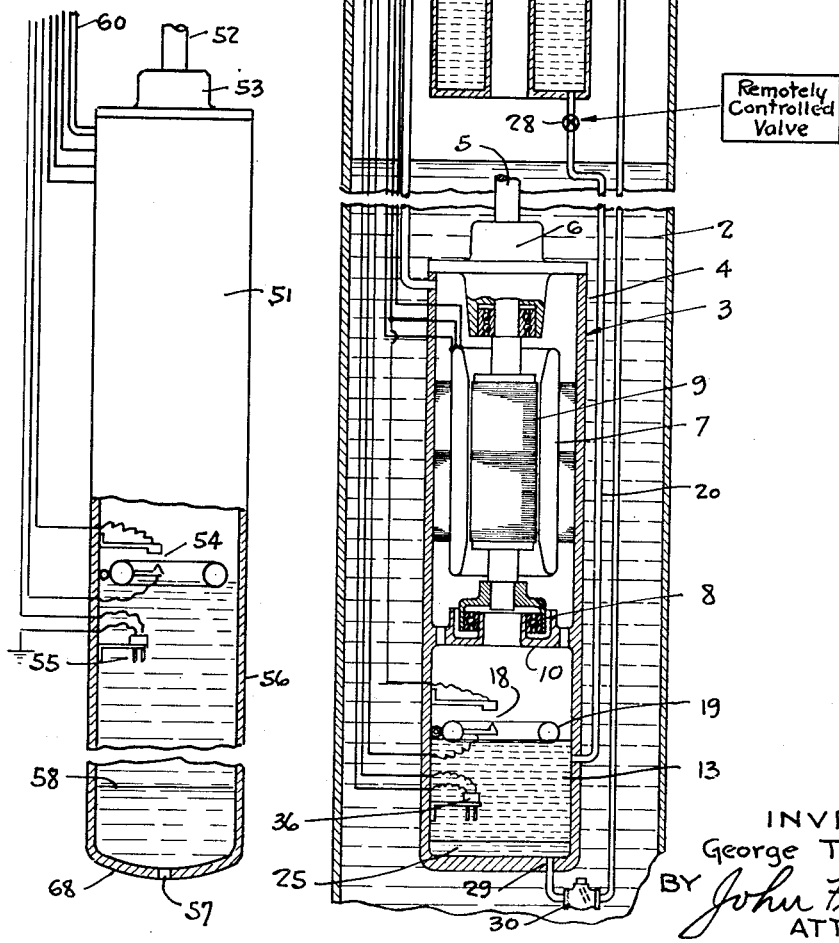
INVENTOR
George T. Pfleger
BY John Flam
ATTORNEY

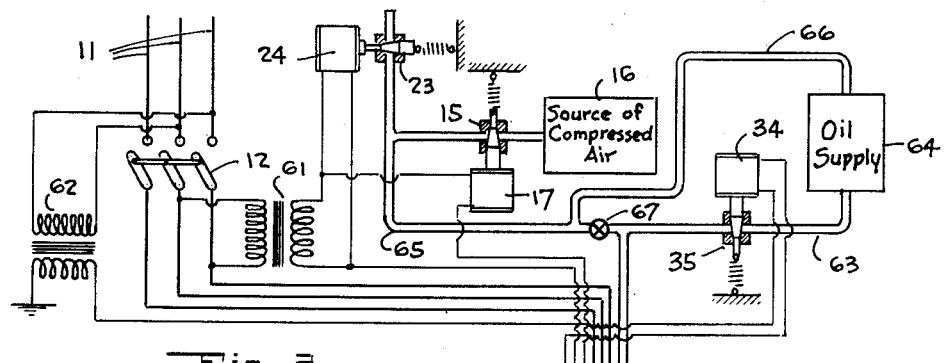
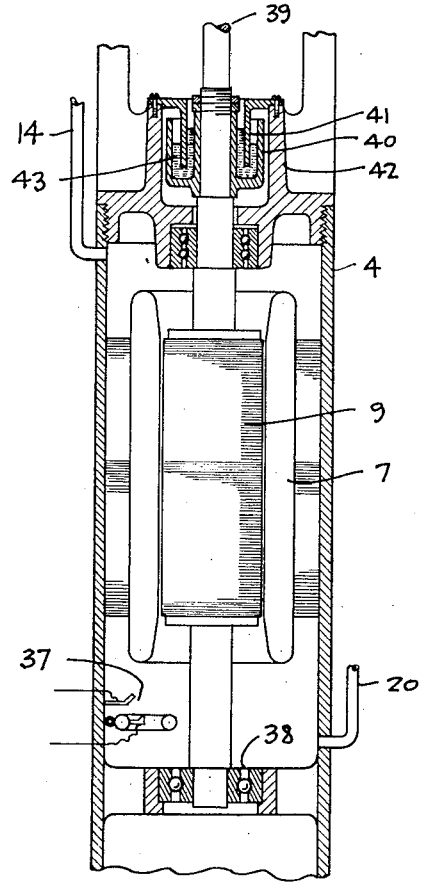
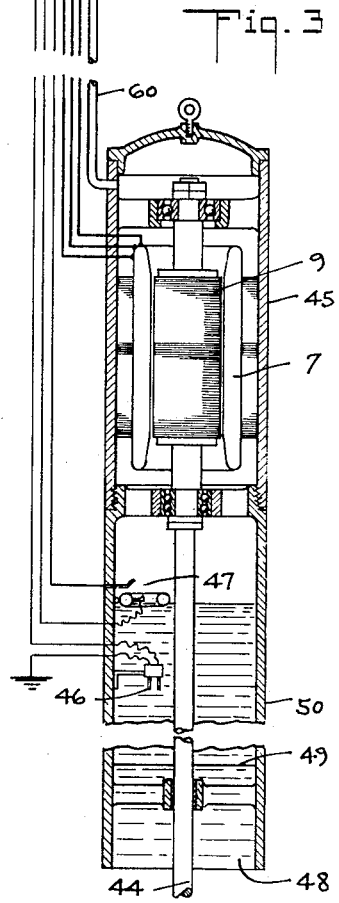

Patented Jan. 9, 1940

2,186,494

UNITED STATES PATENT OFFICE 2,186,494

SUBMERSIBLE ELECTRIC MOTOR

George T. Pfleger, Los Angeles, Calif., assignor to U. S. Electrical Motors, Inc., Los Angeles, Calif., a corporation of California Application December 6, 1937, Serial No. 178,249

20 Claims. (Cl. 172—36)

This invention relates to a structure adapted to be submerged in a liquid as in a well; for example, the structure may be a fluid tight electric motor having a shaft for operating a pump for the liquid. Such motors of this general character have been proposed and used in the past. Ordinarily they are squirrel cage induction motors.

In order to prevent the well liquid (usually water) from ever entering into the motor casing, precautions commonly exercised heretofore included provision of a filling of insulating liquid for the rotor casing. This liquid is most conveniently a lubricant, such as oil, whereby the running parts of the motor are lubricated. The windings are appropriately fashioned so that the oil bath to which they are subjected does not adversely affect them. An additional precaution usually exercised is the provision of a suitable seal around the shaft where it extends out of the casing.

Although the liquid filling can be made to fulfill its desired purpose of protecting the motor interior, yet it introduces a serious disadvantage. When the motor is in operation, the motion of the rotating parts within the casing is retarded. There is a frictional loss that is not present when the parts rotate in air or gas. Accordingly there is a reduction in motor efficiency. This disadvantage of liquid friction is especially pronounced for high speed motors; for example two-pole sixty-cycle induction motors.

It is one of the objects of this invention to make it possible to obviate this friction loss, and thereby to make it feasible to utilize a high speed directly connected pump, with its inherently higher efficiency and greater economy.

This general result is obtained by insuring that only during periods of inactivity is there a liquid filling in that part of the casing where the rotary structure is located. Such inactive periods are ordinarily of extended duration; protection is afforded by the liquid filling against entry of well liquid during these periods.

During active periods, the casing is filled with air or other inert gas that is under sufficient pressure to prevent the entry of the well liquid. Since it requires greater precautions to insure against entry of well liquid in casings having a gaseous filling, this filling is maintained only during these active periods of motor operation.

Accordingly it is another object of this invention to make it possible to select the character of the filling for the casing, and especially in accordance with the conditions of operation of the motor.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagrammatic view showing a submersible casing and its associated parts in section and disposed within a well, together with a diagram of the control system therefor;

Fig. 2 is a fragmentary sectional view of a slightly modified form of the motor casing;

Fig. 3 is a view similar to Fig. 1, of a modification of the submersible casing, together with a modified form of the control system; and Fig. 4 is a view of a modification of the submersible casing of Fig. 3.

In the form of the invention illustrated in Fig. 1, the well is shown as defined by a casing 1. Within the well is shown the well liquid 2, which is usually water, in most instances carrying impurities or foreign matter in suspension. For this reason it is highly desirable to exclude the well liquid 2 from the interior of any submersible motor and to prevent injury to the current carrying parts enclosed within the motor casing or to the bearing structures therein.

The submersible electric motor 3 is shown as having a casing 4 disposed within the well liquid 2. This motor has, in this instance, an upwardly directed shaft 5 extending through the seal 6 at the top of the casing 4, and adapted to be directly connected to a pump (not shown). The shaft 5 carries the rotor 9. The stator winding 7 is adapted to be energized from a suitable source of electrical energy through the mains 11 at the top of the well and through the switch 12. Although the wires leading from this switch are shown in diagrammatic fashion as extending into the well, it is of course to be understood that appropriate cable structures for connections fitting in a fluid tight manner within the wall of the casing 4, are to be used. Such cable constructions by themselves form no part of this invention.

The lower end of the shaft 5 is shown as supported in any appropriate manner, as for example by the ball bearing structure 8, in turn shown as disposed on a spider 10 extending from the wall of casing 4.

The arrangement is such that an insulating neutral liquid, preferably oil, fills the casing 4 completely to its top during periods of inactivity of the motor 3. However, when the motor 3 is energized through the switch 12, the level of the oil filling 13 is lowered so as to be a substantial distance below the top of casing 4, and thereby to obviate loss of energy through liquid skin friction. Such liquid friction is occasioned by the pressure of the oil in the motor air gap, and by rotation of rotor 9 within the liquid.

The lowering of the level of the body of liquid 13 upon energization of the motor is accomplished by passing a suitable gaseous medium under pressure into the casing 4. For example, compressed air can be passed into the casing 4, as by the aid of a conduit 14 leading to the top of the well. This conduit 14 is connected through a valve 15 to a source 16 of compressed air, which may be a compressor or reservoir. The valve 15 normally interrupts the connection between the source 16 and the conduit 14. However, this valve may be opened, as for example by the aid of a solenoid 17.

The circuit energizing the solenoid 17 is controlled by the main switch 12, as well as by the series auxiliary switch 18 arranged adjacent the bottom of casing 4. Thus in order that compressed air pass into the casing 4 to depress the liquid level therein, it is necessary that both switches 12 and 18 be closed. Switch 12, of course, is closed only when the motor 3 is to be energized. Switch 18 is controlled by a float mechanism 19 and opens when the liquid level has reached a limiting low position. Switch 18 is used to reenergize solenoid 17 whenever, during motor operation, the oil level moves to an undesired upper limit.

The lowering of the level of the liquid 13 within the casing 4 is accomplished in this form of the invention by expelling the liquid through a conduit 20 into a storage receptacle 21, shown as located in the well casing and adjacent the top thereof. This receptacle 21 has a conduit 22 leading to the atmosphere at the top of the well. With switch 12 closed, and assuming that the casing 4 has been filled with the body of insulating liquid, such as oil, the switch 18 is also kept closed on account of the buoyancy of float 19, which causes the lower contact to engage the upper contact of switch 18. Accordingly solenoid 17 is energized, and compressed air passes downwardly through conduit 14. The oil 13 is passed through conduit 20 up into the receptacle 21. The air in receptacle 21 is displaced and passes through the upwardly directed conduit 22.

It is thus seen that during energization of the motor 3 the casing 4 is filled with air and there is no material frictional losses.

Let it now be assumed that the motor 3 is deenergized, as for example by opening the switch 12. As soon as this occurs, the valve 15 closes, because solenoid 17 is then deenergized. The gravity head of the liquid in the receptacle 21 tends to urge it through the conduit 20 into the casing 4. In order to provide an escape for the air trapped within the casing 4, a valve 23 is provided at the top of the conduit 14. This valve opens the conduit 14 to atmosphere while the switch 12 is disconnected. When switch 12 is closed, the solenoid 24 which operates the valve 23, is energized and closes the valve 23. In this way it is assured that during energization of the motor no means of escape is provided for the compressed air except downwardly into the casing 4. As soon as the motor 3 is deenergized, the solenoid 24 is also deenergized; the valve 23 opens to atmosphere. Accordingly, the gravity head of the liquid in receptacle 21 is sufficient to expel the air from casing 3. This gravity head may be sufficient to raise the oil level to within the conduit 14, but this is immaterial.

During energization of the motor 3, air pressure within casing 4 may be reduced, as by leakage, to such an extent as to cause the liquid 13 to move upwardly therein. The float switch 19, however, would then be closed and the source of compressed air 16 would be connected to the conduit 14 until the liquid level lowers again to open the switch 18.

At times it may be desirable to replace the oil 13 in the casing with fresh oil. For this purpose a filler cap 26 may be opened at the top of the conduit 14 through which fresh liquid may be supplied. Since the filler end is considerably above the casing 4, a sufficient gravity head is thereby produced to expel the body of liquid 13. However, this expulsion is accomplished through a conduit 27 into the well liquid 2. During this operation the conduit 20 leading to the receptacle 21 must be interrupted, as by a valve 28 controlled from the top of the well. When valve 28 is closed and oil is passed through the filler 26, the gravity pressure of the oil serves to pass the old filling through the bottom aperture 29 in casing 4 up through the pipe 27 and finally into the well liquid. A check valve 30 is provided in the conduit 27 to insure that liquid can flow only from the exterior of the casing and not from the casing. After the casing 4 is thus filled with fresh liquid, the valve 28 may be opened.

When the motor 3 is energized, the air pressure in conduit 14 tends to pass the oil in the casing through conduit 27, as well as through conduit 20 into the receptacle 21. However, there is not as much resistance to the passage of the oil through conduit 20 as there is through conduit 27, because the open end of conduit 27 is somewhat above the top receptacle 21, and the interior of the latter is maintained at atmospheric pressure of conduit 22. Accordingly the oil, under normal operating conditions, is expelled into the storage receptacle 21.

The oil 13 within the casing 4 is lighter than the well liquid 2. Accordingly, if there be any leakage of water within the casing 4, this water would collect, as indicated at 25, in the bottom of the casing. It is desired to eliminate the possibility of having the water level extend to any appreciable extent into the casing 4. For this purpose use is made of an automatic means for increasing the gravity head of the oil in receptacle 21 so as to force the water 25 finally through the check valve 30.

For this purpose use is made of a source of oil supply 31 connected as by conduit 32 to the filler 33 connected to the top of the conduit 22. A solenoid 34 operates a valve 35 in conduit 32. When the solenoid 34 is energized the valve 35 is opened, but when solenoid 34 is not energized, the valve 35 is closed. The valve 35 controls the supply of oil to the filler 33.

The circuit for solenoid 34 is controlled by a water detector device 36 located in the bottom of the casing 4. This comprises merely a pair of electrodes in series with solenoid 34 and with two of the mains 11. Upon the arrival of the water level at least to the level of these electrodes, the current is permitted to flow in this series circuit due to the current carrying property of the well liquid 2. This current is sufficient to operate solenoid 34 to open switch 35. Oil, therefore, drops through the conduit 32 until sufficient gravity head is obtained to expel the water 25 below the detector 36 and through the check valve 30. As soon as the water level recedes, the circuit for solenoid 34 is interrupted and the valve 35 closes.

In the form of the invention illustrated in Fig. 2, the float operated switch 37, which controls the ingress of compressed air through the conduit 14, is shown as located above the thrust ball bearing structure 38. In this way it is assured that this bearing structure will be continually flooded with oil.

This form also illustrates a type of liquid seal that may be used as one form of the seal indicated by reference character 6 in Fig. 1. In this case the motor shaft 39 carries a rotary cup 40. Into this cup extends downwardly the non-rotary annular member 41 supported on the top of the extension 42 of the casing 4. Within this cup 40 may be placed a heavy sealing liquid 43, such as mercury or carbon tetrachloride or carbon bisulfide. The level of the sealing liquid 43 is sufficient to extend considerably above the lower edge of the non-rotary member 41. It is thus apparent that the well liquid is in contact with that top surface of liquid 43 which is inside of the annular member 41; and the filling of casing 4 is in contact with that top surface of the sealing liquid 43 which is exterior of the annular member 41.

It is to be understood that the depth of cup 40, as well as the length of annular member 41 must be such that the excess pressure due to the pressure needed to depress the liquid level within the casing will not depress the surface of the sealing liquid 43 which is exposed to this pressure, below the lower edge of this member 41 and destroy the seal. As this pressure differential is comparatively small, a sufficient length may be provided easily.

It is not essential for the aims of the invention that the motor shaft extend upwardly. Thus, in the form illustrated in Fig. 3, the motor shaft 44 extends downwardly from the casing 45, which has an extension or skirt 50, entirely open at its lower end 48. It is to be understood that in this form, shaft 44 drives a pump suitably supported below the casing. By this construction, the need of a seal where the shaft leaves the casing is obviated, and the check valve controlled conduit 27, and receptacle 21 with its connection 20 can be dispensed with. As in the first form, compressed air or other inert gas is admitted through pipe 60 to the top of the casing 45, and forces the neutral liquid or oil downwardly from around the motor. In this form, however, the neutral liquid is forced downwardly into the skirt 50, the well liquid therein being forced out through the pen end 48. It is thus seen that the extension of the casing forms a receptacle for the neutral liquid, when this is displaced from around the motor. The length of the skirt is such that under proper operating conditions, the surface of contact 49 between the neutral liquid and the well liquid remains within the skirt when the surface of the neutral liquid has fallen sufficiently to open float switch 47 and stop the admission of compressed air. Thus, none of the oil is forced out into the well.

Electrically operated valves 15 and 23 controlled by float switch 47 serve to control the admission and exhaust of air from the casing, as in the form shown in Fig. 1. In this case, however, a step-down transformer 61 is interposed between solenoids 17 and 24 and the motor leads, so that no high voltage is present in this control circuit. A water detector 46 is also provided, as before, which controls the electrically operated valve 35 to admit oil to the casing in case water level 49 reaches the detector. A step down transformer 62 is also interposed in this circuit, between solenoid 34 and the power mains 11. One side of this transformer and one lead of the water detector may be grounded if desired.

Conduit 60 has two branches at its upper end; one of them 63, controlled by valve 35, leads to a closed tank or receptacle 64 containing the oil, or neutral liquid; the other branch 65 leads to the source of compressed air 16, and is controlled by valves 15 and 23. A branch conduit 66 connects conduit 65 with oil receptacle 64, so that the pressure on the oil in the receptacle always equalizes with the pressure in casing 45. Thus, opening of valve 35 will permit oil to flow into the casing regardless of whether it is filled with compressed air or oil. If the oil receptacle would be open to the atmosphere, opening of valve 35 while casing 45 has compressed air in it, would permit this air to escape through the oil supply. A manually operated valve 67 is provided in conduit 65, between branch conduit 66 and the main conduit 60. This valve is normally open, and is closed only when it is desired to fill the casing with fresh oil. If air under pressure is admitted to conduit 65, with this valve closed and valve 35 open, the pressure will be effective to force oil from receptacle 64 into casing 45. The old oil in the casing is displaced downwardly out of contact with the motor, and possibly out of the lower end of the skirt.

In Fig. 4, is illustrated a variation of the submersible casing shown in Fig. 3. In this form, the casing 51 encloses a motor, as before, the motor shaft 52 however, extending upwardly out of the casing through a suitable seal 53, as in the first form of the invention. Casing 51 has a downward extension or skirt 56, the lower end of which is closed by wall 68 provided with a small opening 57. A float operated switch 54 controls the admission of compressed air or gas through conduit 60, as in the form shown in Fig. 3, and water detector 55 regulates the admission of oil in the same way. This form operates in the same way as the form shown in Fig. 3, the skirt 56 forming a receptacle for the neutral oil as it is forced down away from the motor and being of such length that under normal operating conditions, no oil is forced through opening 57 into the well.

In all of the forms illustrated, it is apparent that there is an interchange of liquid and air within the submersible casing. The movement of the liquid in and out of the casing is rendered automatic and in response to the energization and deenergization of the motor.

What is claimed is:

1. In a submersible motor, a casing, a rotor and a stator within the casing, a liquid filling for the casing, and means responsive to energization of the motor for expelling at least some of the filling from the casing.

2. In a submersible motor, a casing, a rotor and a stator within the casing, a liquid filling for the casing, and means responsive to energization of the motor for admitting a gaseous filling into the casing.

3. In a submersible motor, a motor casing, means forming a liquid receptacle, a body of liquid adapted to fill the casing, means whereby the casing and the receptacle are in communication, and means for forcing the liquid from the casing into the receptacle.

4. In a submersible motor, a motor casing, means forming a liquid receptacle, a body of liquid adapted to fill the casing, and means responsive to energization of the motor for passing the liquid from the casing into the receptacle.

5. In a submersible motor, a motor casing, means forming a liquid receptacle, a body of liquid adapted to fill the casing, and means for passing the liquid from the casing into the receptacle, comprising means for passing a gaseous medium under pressure into the casing.

6. In a submersible motor, a motor casing, means forming a liquid receptacle, a body of liquid adapted to fill the casing, and means for passing the liquid from the casing into the receptacle, comprising means for passing a gaseous medium under pressure into the casing, and means limiting the operation of the said passing means in response to the lowering of the liquid level substantially below the top of the casing.

7. In a submersible motor, a casing, a liquid filling for the casing, and means operated selectively by the energization and deenergization of the motor to cause respectively the expulsion of the liquid, and the return of liquid into the casing.

8. In a submersible motor, a casing, a liquid filling for the casing, and means operated selectively by the energization and deenergization of the motor to cause respectively the expulsion of the liquid, and the return of liquid into the casing, including a float switch subjected to said liquid, and a source of gas under pressure controlled by said switch.

9. In a submersible motor, a motor casing, a liquid receptacle, a body of liquid adapted to fill the casing, means for passing the liquid from the casing into the receptacle, and means for rendering said passing means ineffective whereby the liquid is permitted to reenter the casing.

10. In a submersible electric motor having a casing adapted to be filled with a body of insulating liquid, and to be submerged in well liquid, means forming a one-way discharge passage from the bottom of the casing, a receptacle for receiving the liquid from the casing through other than said passage, means forming an inlet into the casing for insulating liquid or for a gas under pressure, and means for optionally causing the liquid filling from the casing to pass either through the one-way passage or into the receptacle, upon ingress of fluid through the inlet.

11. In a submersible electric motor adapted to be submerged in well liquid, a casing including a skirt extending below the motor and forming a receptacle open to well liquid at its bottom, a body of insulating liquid lighter than the well liquid for filling the casing to below a limiting level, and means for supplying a gas under pressure into the casing to prevent rise of well liquid therein and to expel the insulating liquid into the receptacle.

12. In a submersible electric motor adapted to be submerged in well liquid, a casing including a skirt extending below the motor and forming a receptacle open to well liquid at its bottom, a body of insulating liquid lighter than the well liquid for filling the casing to below a limiting level, and means responsive to energization of the motor for supplying a gas under pressure into the casing to prevent rise of well liquid therein and to expel the insulating liquid into the receptacle.

13. In a submersible motor, a motor casing, a body of liquid adapted to fill the casing, and means for causing the liquid level within the casing to be lowered, said means operating in response to energization of the motor.

14. The method of operating a submerged electric motor which comprises maintaining the motor casing substantially full of an inert lubricating liquid during the time when the motor is deenergized, and replacing at least the major part of said liquid with gas while the motor is energized.

15. The method of operating a submerged electric motor which includes supplying a gaseous atmosphere to the motor casing during periods when the motor is energized and supplying an inert lubricating liquid to the casing when the motor is deenergized.

16. In a submersible electric motor adapted to be submerged in well liquid, a casing, means associated with the casing forming a receptacle open to well liquid at its bottom, a body of insulating liquid lighter than the well liquid for filling the casing to below a limiting level, a means forming source of supply of said insulating liquid connected with the casing, a valve controlling the admission of said liquid to the casing, means for introducing a gas under pressure into the casing to prevent use of well liquid therein and to expel the insulating liquid into said receptacle, and means for equalizing the pressure within the casing and the means forming the source of supply of the insulating liquid.

17. In a submersible electric motor adapted to be submerged in well liquid, a casing, means associated with the casing forming a receptacle open to well liquid at its bottom, a body of insulating liquid lighter than the well liquid for filling the casing to below a limiting level, means forming a source of supply of said insulating liquid, means for introducing a gas under pressure into said casing to force the insulating liquid therefrom into the receptacle, a connection between said source and the casing, whereby insulating liquid may be discharged from said source into the casing, and means forming an equalizing connection between the source and the casing, whereby the pressures in the casing and in the source forming means are maintained substantially equal.

18. In a submersible electric motor adapted to be submerged in well liquid, a casing including a skirt extending below the motor and open at its bottom, a shaft extending from the casing and through the open bottom of the skirt, a body of insulating liquid lighter than the well liquid for filling the casing to below a limiting level, and means for supplying a gas under pressure to the casing to prevent use of well liquid therein and to expel the insulating liquid from around the motor into the skirt.

19. In a submersible motor, a motor casing, means forming a liquid receptacle, a body of insulating liquid adapted to fill the casing, means for introducing a gas under pressure into the casing to expel the liquid from the casing into the receptacle, a shaft extending out of the casing, and means forming a liquid packed seal about said shaft where it leaves the casing.

20. In a submersible motor, a motor casing, means forming a liquid receptacle, a body of insulating liquid adapted to fill the casing, means for introducing a gas under pressure into the casing to expel the liquid from the casing into the receptacle, a shaft extending out of the casing, and a liquid packed seal about said shaft where it leaves the casing, said seal including a cup, and an annular member surrounding said shaft and relatively rotatable, said member extending into the cup, and a liquid filling in the cup and surrounding the member, the depth of the liquid with respect to the member being such as to prevent the escape of gas under the edge of the member.

GEORGE T. PFLEGER.